United States Patent [19]

Jourdan et al.

[11] Patent Number: 4,551,632
[45] Date of Patent: Nov. 5, 1985

[54] SYSTEM FOR PRODUCING AND DISTRIBUTING ELECTRICAL ENERGY FOR VEHICLES PARTICULARLY AIRCRAFT, AS WELL AS AN ELECTRICAL POWER CENTER FOR SUCH A SYSTEM

[75] Inventors: Jean-Marie Jourdan, Puyricard; Jean Betelle, Toulouse; Philippe M. M. Bougon, Le Tholonet, all of France

[73] Assignee: Societe Nationale Industrielle Aerospatiale, Paris, France

[21] Appl. No.: 488,345

[22] Filed: Apr. 25, 1983

[30] Foreign Application Priority Data

May 5, 1982 [FR] France ................. 82 07812

[51] Int. Cl.[4] .................................. H02G 3/08
[52] U.S. Cl. .......................... 307/9; 307/20;
307/34; 307/42; 307/66; 307/84; 307/86; 307/147
[58] Field of Search .............. 307/66, 84, 86, 147, 307/9, 10 R, 20, 24, 31, 34, 42, 52; 361/62, 64, 66

[56] References Cited

U.S. PATENT DOCUMENTS

| | | | |
|---|---|---|---|
| 2,934,660 | 4/1960 | Brunner | 307/147 |
| 3,864,578 | 2/1975 | Lackey | 307/147 X |
| 4,380,725 | 4/1983 | Sherman | 307/84 X |
| 4,403,155 | 9/1983 | Aoki et al. | 307/10 R |

OTHER PUBLICATIONS

"YC-14 Electrical Power System Unique Features and Problems Solutions", by Ernst et al., National Aerospace & Electronics Conference, May 17-19, 1977.

Primary Examiner—A. D. Pellinen
Assistant Examiner—Derek S. Jennings
Attorney, Agent, or Firm—Marshall, O'Toole, Gerstein, Murray & Bicknell

[57] ABSTRACT

In a system including an electrical power center for producing and distributing electrical energy for vehicles, particularly aircraft, primary circuit breakers and contactors are distributed between a D.C. electrical power center, relay boxes, electronic bays and control panels and the electrical power center forms a central unit grouping together different protection or safety devices. The system permits the electrical network on board an aircraft to be simplified and lightened.

11 Claims, 16 Drawing Figures

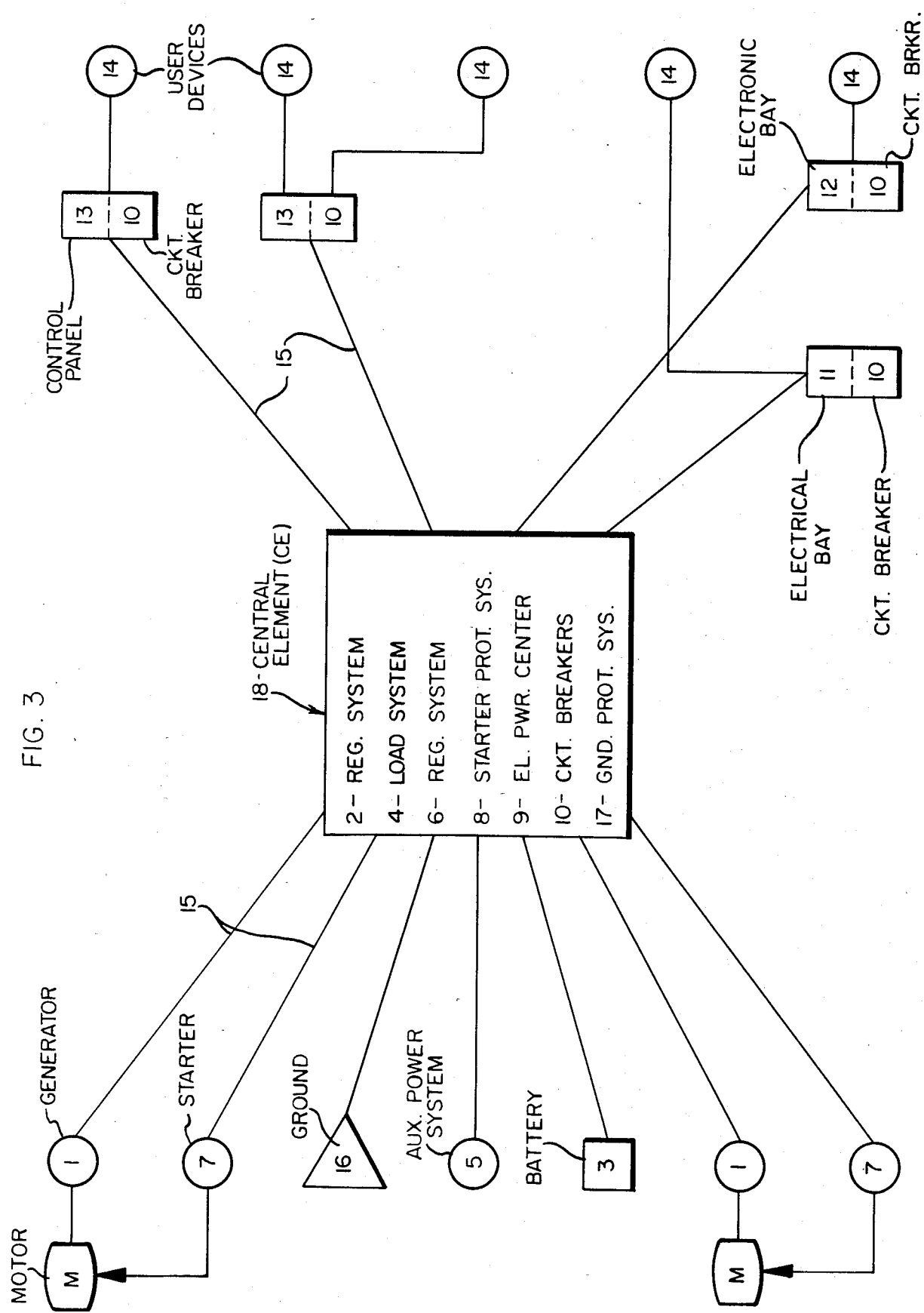

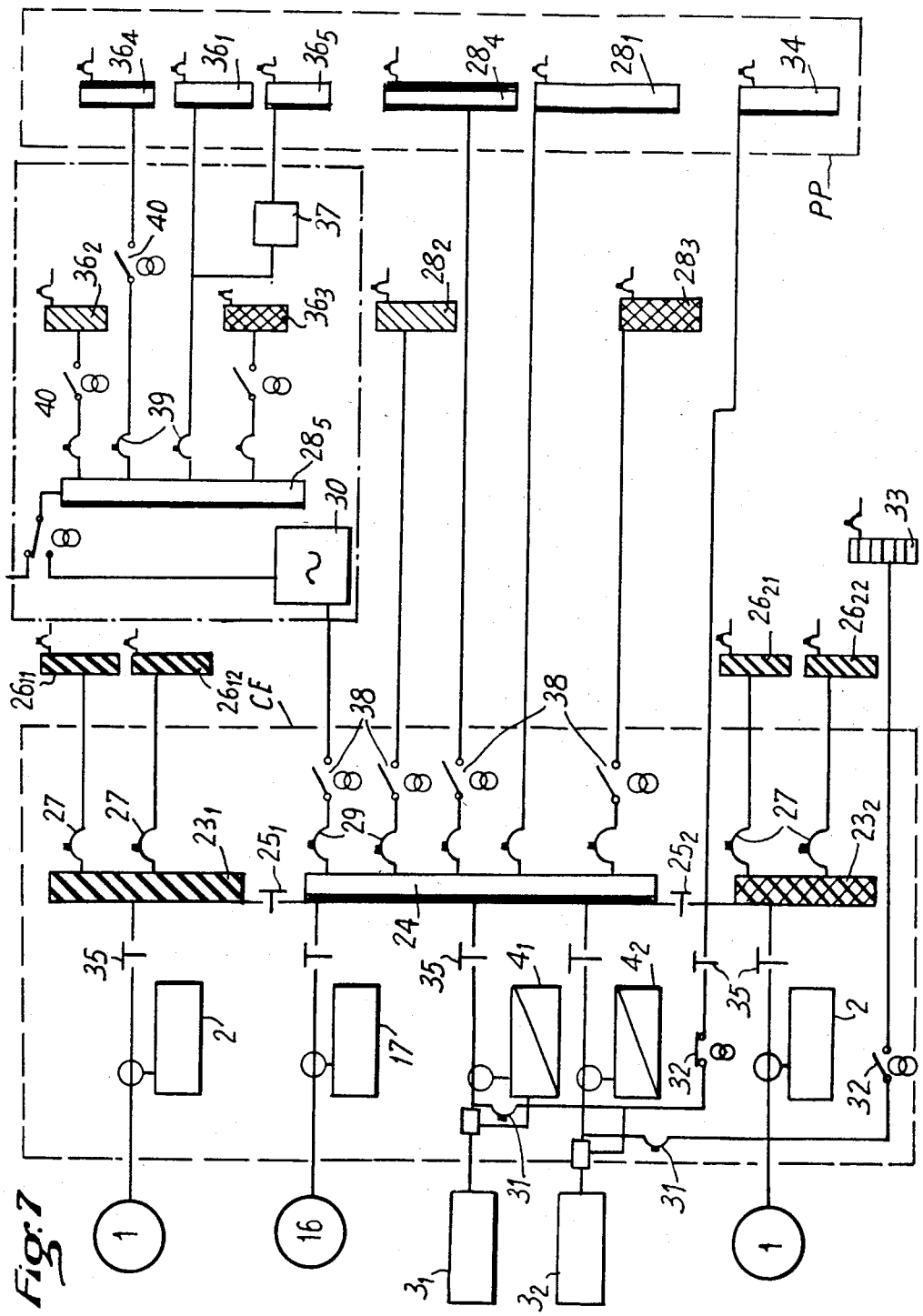

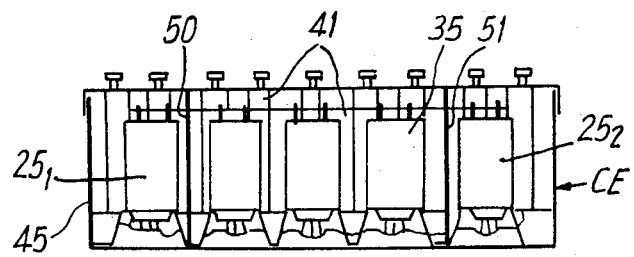
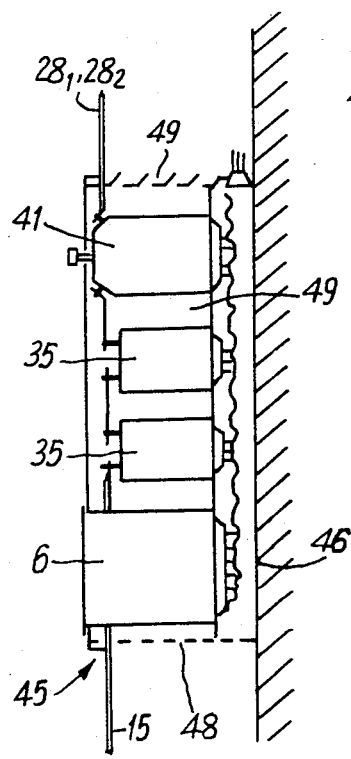
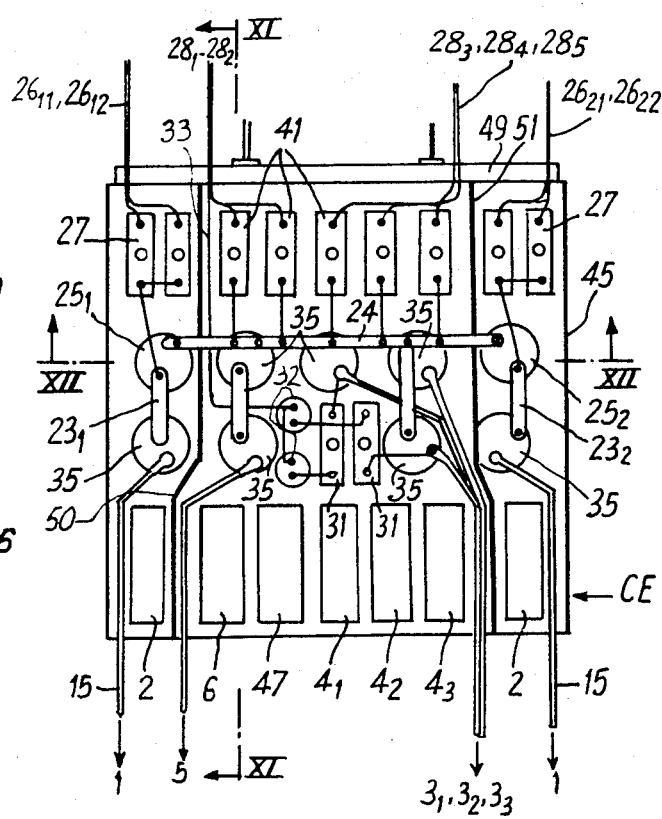

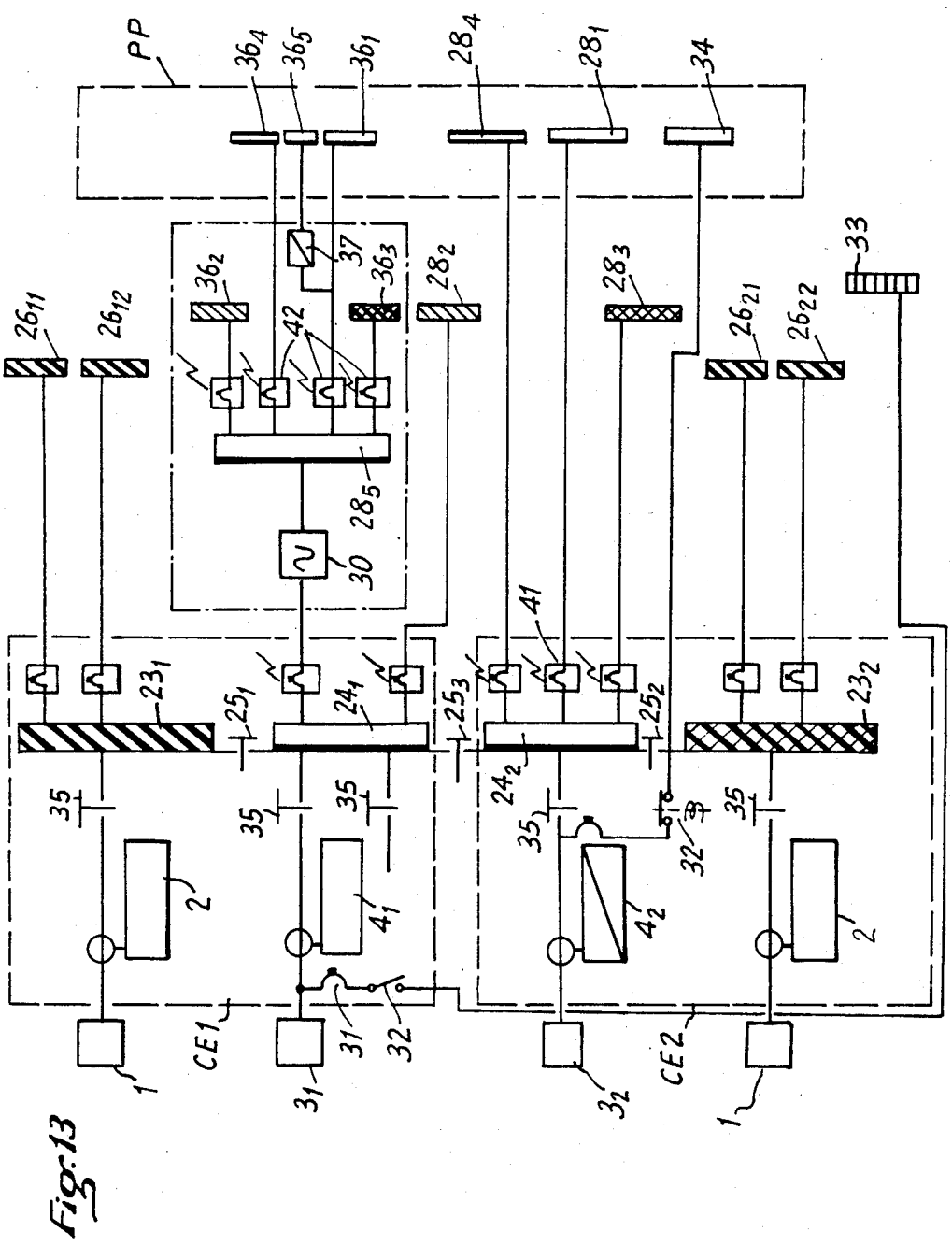

SYSTEM FOR PRODUCING AND DISTRIBUTING ELECTRICAL ENERGY FOR VEHICLES PARTICULARLY AIRCRAFT, AS WELL AS AN ELECTRICAL POWER CENTER FOR SUCH A SYSTEM

The present invention relates to a system for producing and distributing electrical energy for vehicles, and particularly aircraft, as well as to an electrical power centre for such a system.

It is known that a system for producing and distributing electrical energy is provided on board aircraft, which comprises generators moved by the motors of the aircraft. These generators may be of the D.C. or A.C. type, with the result that the aircraft may be supplied either with D.C. electrical energy or with A.C. electrical energy. Moreover, it is usual if the same aircraft simultaneously comprises D.C. generator means and A.C. generator means, so that the different pieces of equipment are supplied either with A.C. energy or with D.C. energy, as a function of the mode of supply which suits them best. For example, the motors of the aircraft drive alternators supplying an A.C. network and, via transfo-rectifiers, this A.C. network supplies a D.C. network. Moreover, it will be noted that it is usual, in aircraft comprising a D.C. network, to provide an A.C. network of which the source is converter supplied by the D.C. network.

The invention relates to a system for producing and distributing electrical energy which, on board a vehicle, may equally well be used alone or in association with another energy producing and distributing system, the latter being independent or derived therefrom, or being the source thereof.

With respect to an A.C. system, a D.C. system presents the primordial advantage of allowing the electrical energy to be stored, so that it makes it possible to supply the equipment necessary for flight in the event of faults in the generators or the motors (such equipment being referred to as emergency equipment), and of ensuring the independence of the start of the motors and of starting a possible auxiliary power unit (so-called APU unit). Moreover, many pieces of equipment give a better performance in D.C. mode, as there are no losses by hysteresis, and the coupling of various D.C. sources may be effected without problem on the same network, as, with the direct current, no frequency and phase demand appears. This latter advantage makes it possible in particular to connect two sources successively on the same network (for example the APU unit further to a defective generator), so as to ensure supply without cut-off of the equipment.

On the other hand, with equal distributed power, a D.C. system requires a distribution wiring whose weight is much greater than that of the distribution wiring of an A.C. system. In fact, in the case of an A.C. system, it is possible to use high voltages and therefore to reduce the diameter of the conductors.

It is an object of the present invention to provide a system for producing and distributing electrical energy, particularly for airplanes and helicopters. Where the system according to the invention is of the D.C. type, whilst making it possible to benefit from the above-recalled inherent advantages of a D.C. system, it allows a considerable reduction in weight with respect to the known D.C. systems and presents a simple structure.

The other objects of the present invention are to produce a system which satisfies the existing rules of certification and which allows:

a maximum operational availability allowing, on the one hand, emergency supply for at least one landing in safety and a flight of at least thirty minutes and, on the other hand, safety margins greater than the standards set by the rules, to allow, for example, take-off with certain elements having broken down;

a simple search for the origin of smoke in the event of the beginning of a fire of electrical origin, which is particularly important in the case of airplanes with pressurized cabin;

a rapid insulation of all the sources of electrical current in the event of forced landing;

independent start of the motors, both on the ground and in flight, either directly or via an auxiliary power unit APU;

supply of services, allowing independence on the ground, for example filling of fuel tanks, minimum lighting, etc . . . ;

supply without cut-off of certain sensitive equipment.

To these ends, according to the invention, the system for producing and distributing electrical energy for vehicles, particularly for aircraft, comprising at least two main generators of D.C. or A.C. type moved by the motors of said vehicle, at least one storage battery, starters for said motors possibly constituted by the main generators themselves, an electrical power centre formed by primary bars supplied from said main generators, primary contactors and primary circuit breakers, an assembly of secondary bars supplied from the primary bars, secondary contactors and secondary circuit breakers, an assembly of relay boxes and electrical bays, an assembly of electronic bays, control panels, user devices, as well as a plurality of regulating and/or protecting means, particularly for the generators, the battery and the starters, is noteworthy in that it comprises a central unit grouping together said electrical power centre, a part of said assembly of circuit breakers and secondary contactors, and said regulating and/or protecting means and in that the rest of said assembly of circuit breakers and secondary contactors is distributed between the assembly of relay boxes and electrical bays, the assembly of the electronic bays and each of the control panels.

In the system according to the invention, the distribution of the current to the various user devices is thus effected in known manner from, on the one hand, normal primary and secondary bars whose supply is furnished solely by the main generators and, on the other hand, by essential and emergency primary and secondary bars which are normally supplied by the main generators, but which are automatically supplied by the batteries in the event of breakdowns of the main generators.

According to an essential feature of the system according to the invention, the arrangement of said primary and secondary bars and the allocation to these bars of groups of equipment are chosen so as to maintain accessible to the pilots only the minimum number of circuit breakers necessary for safety and operational commodities. In addition, the decomposition obtained enables the smoke search procedures to be simplified and the bars maintained in case of emergency according to the phase of flight to be progressively shed, in order to take best advantage of the energy stored in the batteries.

In a first embodiment of the system according to the invention, said central unit comprises a primary bar of normal supply, supplied by the assembly of generators in parallel through said means for protecting said latter and supplying a plurality of secondary bars of normal supply through first primary circuit breakers; a primary bar of essential and emergency supply connected to said battery through the means for protecting and regulating the latter and to said primary bar of normal supply through a primary contactor and supplying a plurality of secondary bars of essential and emergency supply through the second primary circuit breakers; and at least one secondary circuit breaker and one secondary contactor directly connecting a secondary bar to the battery.

However, in a second preferred embodiment of the system according to the invention, said central unit comprises as many primary bars of normal supply as there are generators and each of these primary bars of normal supply is supplied by one generator through the means for protecting the latter and supplies at least one secondary bar of normal supply through a first primary circuit breaker; a primary bar of emergency supply connected to said battery through the means for protecting and regulating the latter and to each of the primary bars of normal supply by a plurality of primary contactors and supplying a plurality of secondary bars of essential and emergency supply through the second primary circuit breakers; and at least one secondary circuit breaker and one secondary contactor directly connecting a secondary bar to the battery.

Whatever the embodiment, said central unit advantageously comprises two secondary circuit breakers and two associated secondary contactors connecting to the battery two secondary bars of which one supplies user devices having to remain constantly connected and of which the other serves specifically to supply equipment when the aircraft is on the ground. Particularly in this case, the system preferably comprises at least two storage batteries connected in parallel to said primary bar of emergency supply; thus each of said secondary bars may be supplied by one of the batteries through one of the assemblies of circuit breakers and secondary contactors.

The plurality of essential and emergency secondary bars supplied by the essential and emergency primary bar through the second primary circuit breakers comprise at least one secondary bar disposed at the pilot's station and adapted to supply approach and landing equipment, at least one secondary bar supplying circuit breakers accessible to the pilots and adapted for common essential and emergency supply, and at least one, but preferably two, secondary bars disposed in the best manner and adapted to supplying equipment which exist in duplicate.

When the system is of the D.C. type and the aircraft comprises, moreover, equipment supplied with A.C., at least one of the essential and emergency secondary bars is supplied by the essential and emergency primary bar through said second primary circuit breakers and a D.C.-A.C. converter and this essential and emergency secondary bar in A.C. mode supplies a plurality of A.C. secondary sub-bars, of which at least one supplies circuit breakers accessible to the pilots and is adapted to supply approach and landing equipment, of which at least one other supplies circuit breakers accessible to the pilots and is adapted for common essential and emergency supply and of which at least one third is disposed in the best manner and intended for supplying equipment which exist in duplicate.

For reasons of convenience, the second primary circuit breakers are advantageously of the remote-controlled circuit breaker-contactor type, rather than of the manually reset circuit breaker type.

In addition, the present invention relates to a central unit grouping together the electrical power centre as is generally designed, a part of the secondary circuit breakers and the regulating and/or protecting means mentioned above. In a concrete embodiment of this central unit, it comprises a mural box of which the lower part encloses the different regulating and/or protecting means, of which the median part with respect to the height comprises the primary contactors, the secondary circuit breakers, the associated secondary contactors and the primary bars and of which the upper part comprises the primary circuit breakers. In the case of application to a system for twin-engined aircraft comprising two primary bars of normal supply and a primary bar of essential and emergency supply, the interior of the box is separated heightwise by fire-stop walls defining three compartments, such that the median compartment encloses the elements relative to the primary bar of essential and emergency supply, whilst each of the lateral compartments encloses the elements relative to one of said primary bars of normal supply.

The invention will be more readily understood on reading the following description with reference to the accompanying drawings.

In these Figures, although the present invention is not limited by the number of the engines of the aircraft for which it is intended, examples of systems for producing and distributing D.C. electrical energy for twin-engine aircraft have been shown.

In the drawings,

FIG. 1 schematically shows the architecture of a known system.

FIG. 2 schematically illustrates the architecture theoretically possible for a system for producing and distributing electrical energy for a twin-engined aircraft.

FIG. 3 schematically shows the architecture of the system according to the invention.

FIG. 7 shows the block diagram in greater detail of the embodiment of FIG. 6a.

FIG. 10 is a front view of a concrete embodiment of the electrical power centre of the system according to the invention.

FIGS. 11 and 12 are sections along lines XI—XI and XII—XII respectively of FIG. 10.

FIG. 13 illustrates a variant of the device of FIG. 9.

In these Figures, identical or similar elements bear identical references, from one Figure to the other, said references possibly being given an index in certain Figures.

To explain and describe the present invention, the example of twin-engine commercial aeroplanes equipped with a system for producing and distributing D.C. electrical energy, has been taken hereinafter. It goes without saying that this example is given by way of illustration and must not be considered as limiting the invention.

Figure 1:
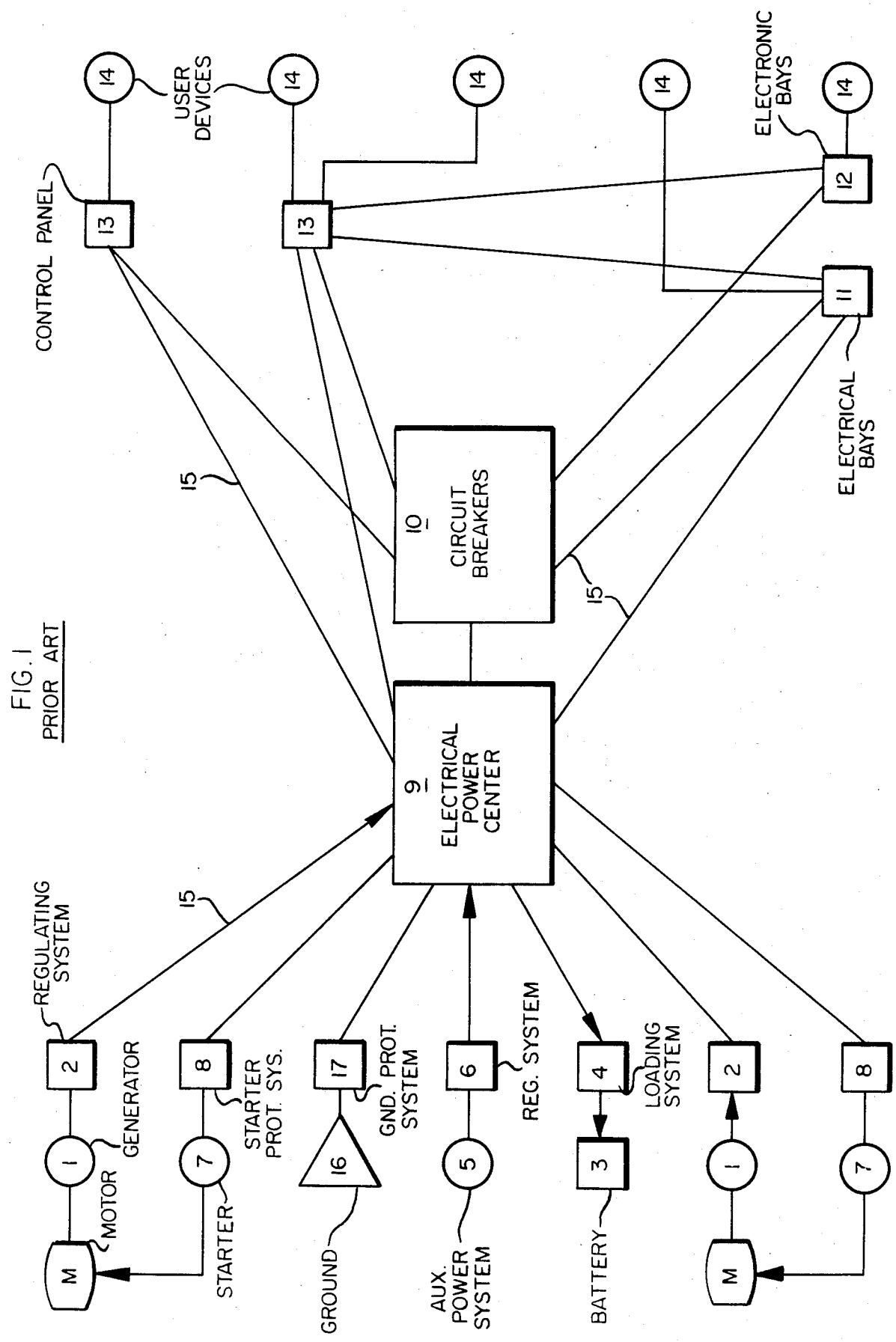

As shown in FIG. 1, the known D.C. network of a commercial twin-engine aeroplane comprises:

Two main generators of which each is driven by one of the motors M of the aircraft. Such generators 1 may either be D.C. generators or alternators followed by transfo-rectifiers.

Regulating and protecting systems 2 associated with the main generators 1.

One or more storage batteries.

A loading and protecting system 4 associated with the batteries 3.

Possibly, an auxiliary power unit 5 (APU).

A regulating and protecting system 6, for the auxiliary power unit 5.

Starters 7 for the motors M. These starters 7 may either be independent or merged with the generators 1 in the case of the latter being generator starters.

Regulating and protecting systems 8 for the starters

An electrical power centre 9 comprising the bars, the contactors, and the primary circuit breakers.

Panels of bars, contactors and secondary circuit breakers 10.

Relay boxes and electrical bays 11.

Electronic bays 12 receiving the black boxes of the systems.

Control panels 13.

User devices 14 which may be grouped on the instrument panels or located in various zones of the aircraft.

Links 15 (cables) between the various elements hereinabove.

A ground connection 16; and

A system 17 for protecting the ground connection 16.

The locations of certain of these elements are fixed imperatively. This applies in particular to the generators 1 which are found on the engines of the aircraft, the control panels 13 disposed within reach of the crew and the user devices 14 distributed at various locations defined according to the functions performed.

The other elements are placed as a function of accessibility requirements and possibilities of installation. The electrical power centre 9 which receives all the power lines and redistributes the primary supplies is located in a central zone. The electrical or electronic bays 11 and 12 must allow good access for maintenance. Furthermore, the batteries 3 must not be far from the electrical power centre 9, with access for easy maintenance, and must be protected in the case of a crash. Finally, a certain number of the secondary circuit breakers 10 must be accessible to the crew during flight when they constitute either the sole means of insulating a system in the event of smoke of electrical origin, or a safety risk in the event of untimely tripping.

As a result of all these imperatives, as shown in FIG. 1, the number and length of the links 15 necessary for making the interconnections between the various elements, is large. It is therefore desirable, to simplify the installation, to reduce as much as possible the number and length of the links 15.

To this end, according to the invention, the various functions performed by the different elements are concentrated and integrated.

Whatever the dimensions of the aircraft, according to the invention, the dimensions of the various components are reduced to save on dimensions and weight. Moreover, several elements are grouped in the same box. In fact, the links inside the same box are generally shorter, simpler to make, more economical and better protected than outside links.

Figure 2:
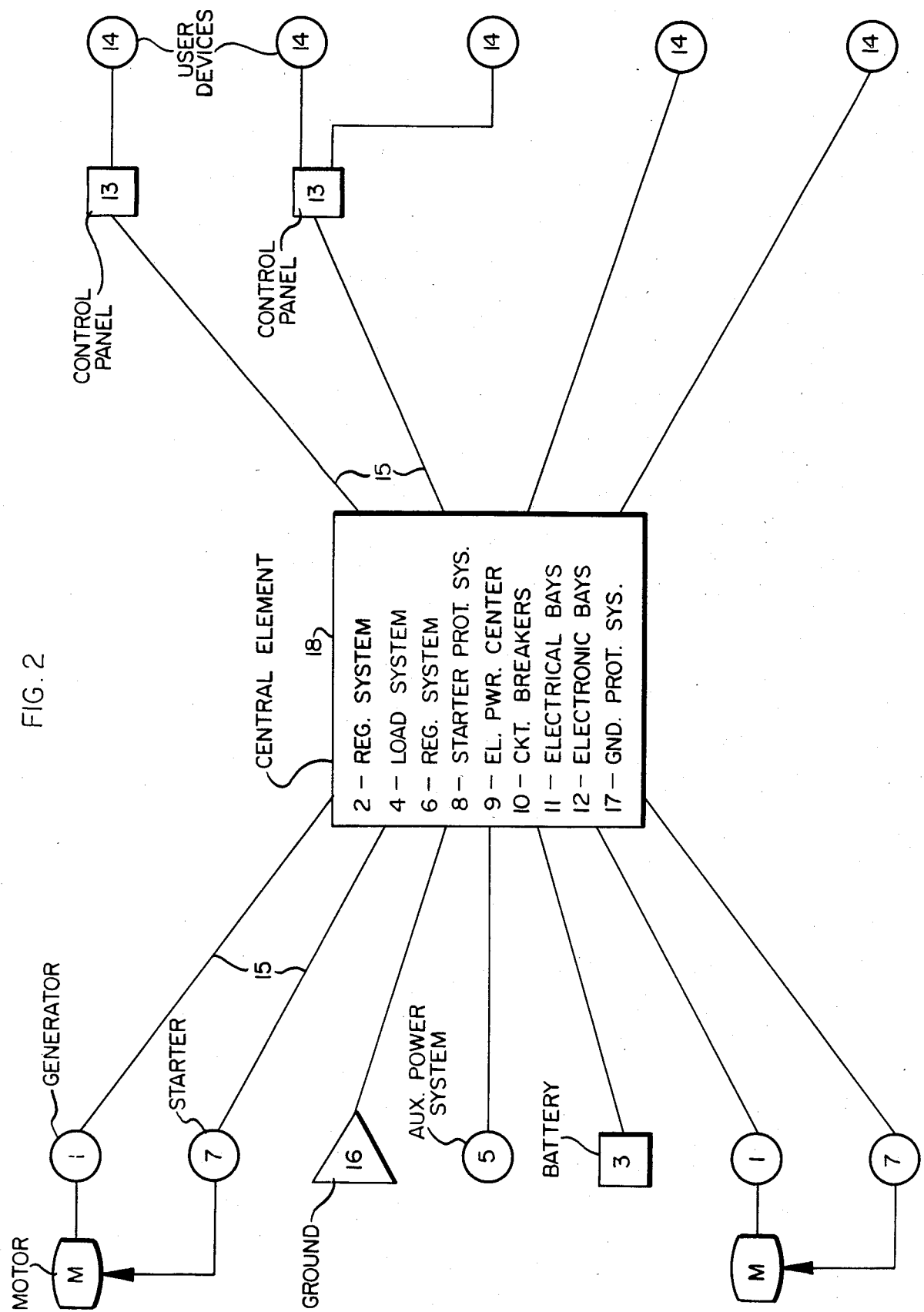

By following the general principles of the invention and as shown in FIG. 2, it may be thought to group together in one central element 18, the regulating and protecting systems 2,4,6,8,17, the electrical power centre 9, the panels of circuit breakers and the secondary bars 10, the relay boxes and the electrical bays 11, as well as the electronic bays 12.

However, such an arrangement could only be made in the case of the whole installation being simple enough for the central element 18 to be made in one box which complies with all the above conditions. In addition, the necessity of segregation of the circuits for safety reasons would impose particular precautions in production.

It will virtually always be necessary to divide the central element 18; on the one hand to allow an implantation matching the geometry of the aircraft, on the other hand for no assembly to have prohibitive dimensions and weight having regard to the conveniences of installation and maintenance.

Two elements in particular must generally (and particularly in the case of commercial twin-engine aeroplanes) constitute units independent of the rest: these are the relay boxes and the electrical bays 11 and electronic bays 12.

Furthermore, the implantation of the secondary circuit breakers 10 raises important problems whose solution depends essentially on the functional diagrams of the distribution and the technologies used. The integration in the electrical power centre 9 may prove impossible in certain case and does not necessarily present the best solution. This is why, according to an important feature of the present invention, the secondary circuit breakers 10 are distributed between the elements of the network 9, 11, 12 and 13.

The choice of the distribution will be made as a function of the criteria:

(1) safety (2) saving in weight (3) operational commodity

FIG. 3 shows the block diagram of a system for producing and distributing D.C. electrical energy according to the invention.

As shown in FIG. 3, the system according to the invention comprises a central element CE which, in addition to the conventional electrical power centre 9, groups together the regulating and protecting systems 2, 4, 6, 8 and 17 and part of the secondary circuit breakers 10; electrical elements 20 which, in addition to the relay boxes and the electrical bays 11, comprise a part of the circuit breakers and secondary bars 10; electronic elements 21 which, in addition to the electronic bays 12, comprise a part of the circuit breakers and secondary bars 10; and control elements 22 which, in addition to the control panels 13, also comprise a part of said circuit breakers and secondary bars 10.

In this way, the integrated electrical power centre CE according to the invention comprises functions which exceed those usually attributed to the electrical power centres (addition of the functions of devices 2, 4, 6, 8 and 17 and partially 10).

Consequently, the definition of this electrical power centre is necessarily more complex than that usually admitted (this furthermore being translated by a simplification of the whole installation). Such a definition comprises the determination of the number of primary and secondary bars to be envisaged. It is known that the primary and secondary bars, also called bus bars, constitute the link elements between the sources of current and the user devices via the cut-off elements (contactor relay, etc . . . ) and the protecting elements (circuit breaker, etc . . . ). Of course, the number of bars or sub-bars to be provided is associated with the number of groups of systems which may be associated.

The above-mentioned purpose of seeking the origin of smoke leads to define, in the first place, a means for rapidly cutting off the supply of the largest number of possible systems, whilst maintaining a group of systems sufficient to continue the flight and eliminate the smoke. A simple procedure must consequently enable the healthy systems to be returned to service, eliminating the faulty systems.

Furthermore, the above-mentioned objective concerning the emergency leads to maintaining the emergency supply on as small a number of systems as possible allowing in the first place a diversion and then a landing in safety.

The groups of systems defined by these two objectives do not overlap totally, but they have numerous common points.

If the assemblies of systems corresponding to each of the phases of flight are considered, the following groups may be defined:
  (a) Minimum system for seeking smoke;
  (b) Emergency system in cruising phase;
  (c) Emergency system in approach and landing phase;
  (d) Normal systems.

Among these systems, the systems of groups (a) and (b) have an important common part; the groups of independent and complementary systems may therefore be constituted by:
  (1) minimum equipment common to smoke seeking and emergency;
  (2) smoke seeking equipment;
  (3) emergency equipment in cruising phase;
  (4) emergency equipment in approach and landing phase;
  (5) normal equipment.

Moreover, to satisfy the safety objectives connected with the failure rate of the equipment, or to allow a mission to be carried out with certain equipment broken down, a duplication of a certain number of systems is generally provided.

Two categories follow which support the preceding groups:
  (1) systems of which there is only one on board;
  (2) systems which are duplicated.

Finally, to complete the survey of the groups of necessary systems, the systems constantly connected to the batteries but comprising a possibility of cut-off to be used in the event of a crash, should be added.

This concerns certain equipment such as watches or inertial reference systems, as well as the systems which are supplied on the ground to perform certain services (filling of the fuel tank, minimum lighting, etc . . . ) in order to obtain independence on the ground without being obliged to switch on the whole installation.

The diagram of the electrical power centre CE according to the invention also depends to a certain extent on the type of supply retained, namely exclusively D.C. supply or mixed D.C. and A.C. supply. In the case of mixed supply, there are two variants which are, respectively, supply by D.C. generators and D.C.-A.C. converter and supply by transfo-rectifiers each associated with an alternator.

The difference between these two types essentially concerns regulation, protections and the normal A.C. network.

In addition, different cases may be considered, depending on whether starting of the motors is obtained by generator-starters or by separate starters and whether there is a ground connection or an auxiliary unit.

Figure 4A:
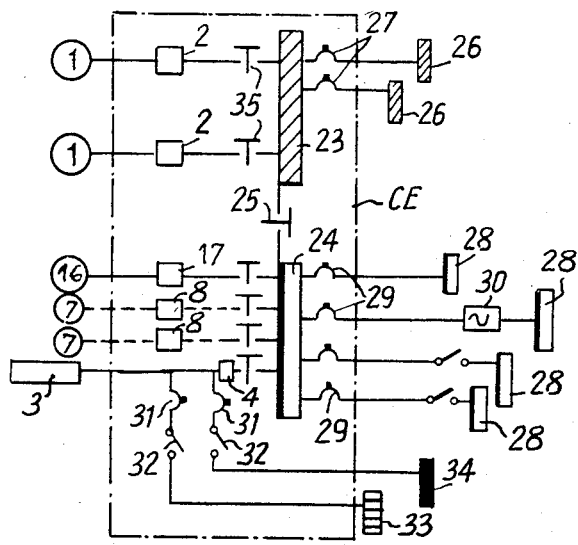
FIGS. 4a, 5a and 6a show the simplified block diagrams of three examples of a system according to the invention of D.C. type, in the case of the main generators being D.C. generators.
Figure 4B:
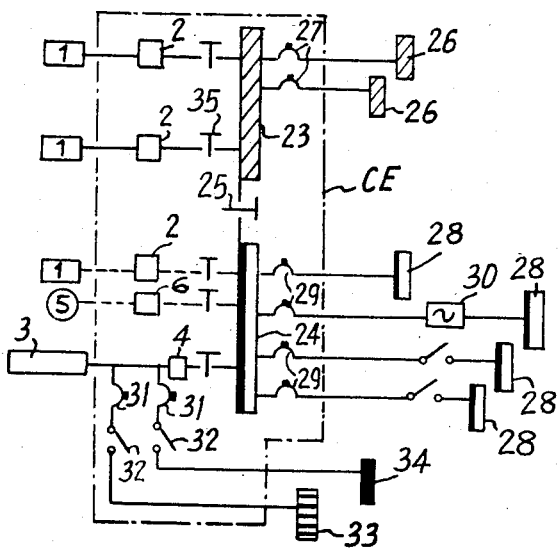
FIGS. 4b, 5b and 6b are simplified block diagrams corresponding respectively to the examples of FIGS. 4a, 5a and 6a, in the case of the main generators being alternators associated with transforectifiers.
Figure 5A:
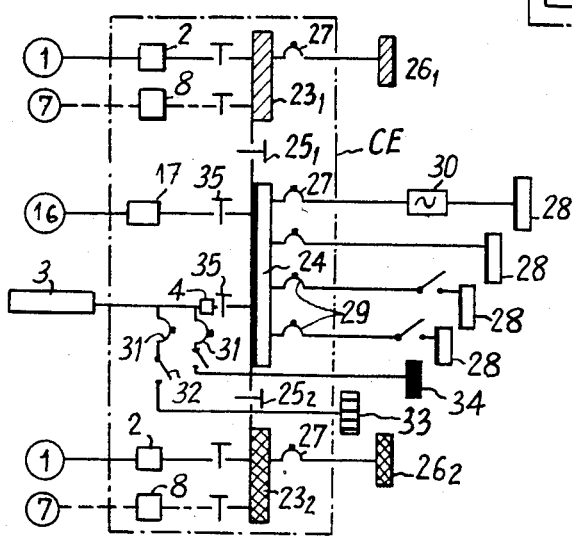
Figure 5B:
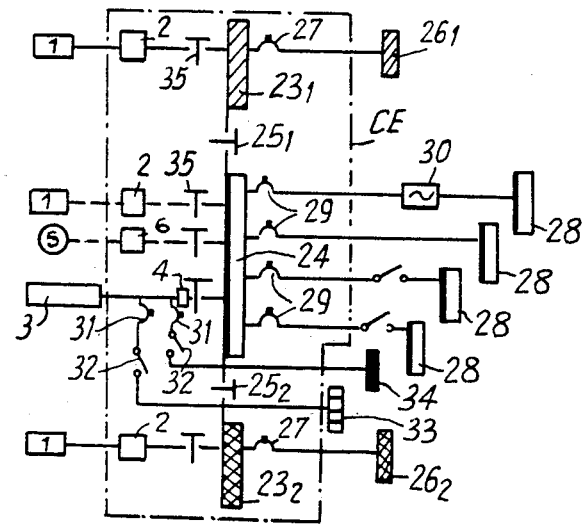
Figure 6A:
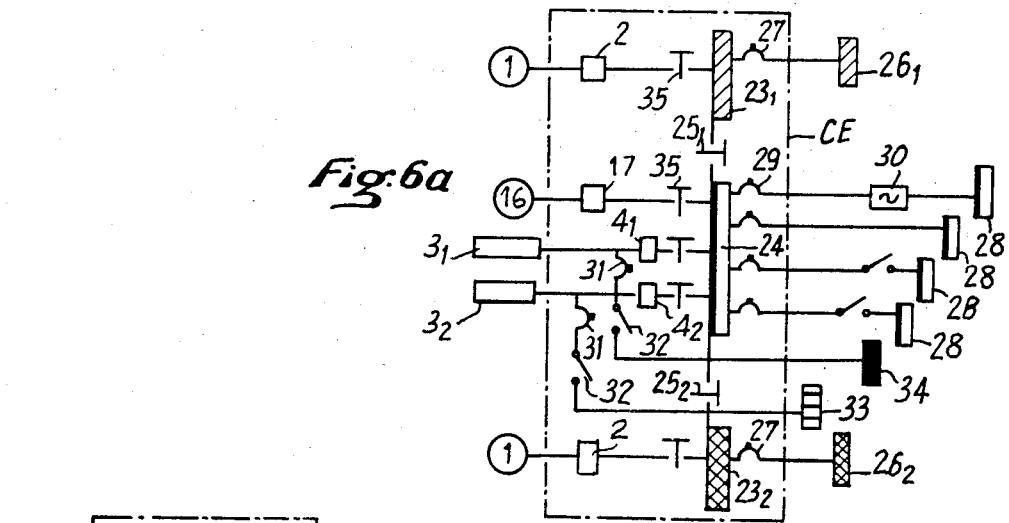
Figure 6B:
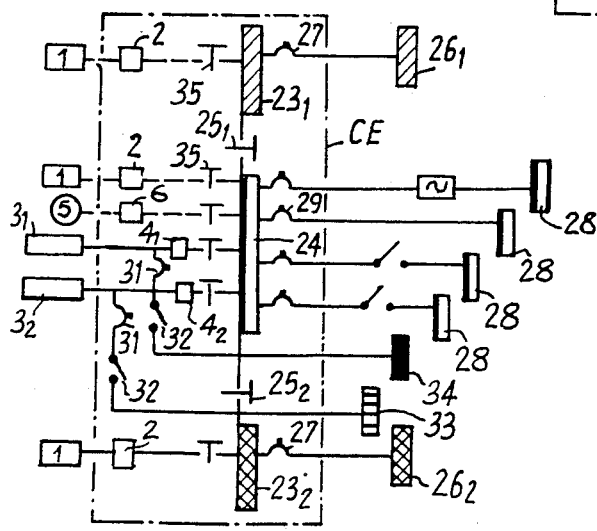

FIGS. 4a, 4b, 5a, 5b, 6a and 6b schematically show some examples of electrical power centre CE according to the invention corresponding to the minimum of bars which may be envisaged in the cases indicated above. These simplified diagrams do not indicate the decomposition into right-hand or left-hand groups of the elements which are in duplicate. FIGS. 4a, 5a and 6a show embodiments comprising two D.C. generators 1 and a ground connection 16, whilst FIGS. 4b, 5b and 6b illustrate embodiments comprising three transfo-rectifiers 1 (two main ones associated directly with two alternators moved by the motors and the third auxiliary one adapted to be connected on one or the other of the alternators) and an auxiliary power unit APU 5 also serving to start up the motors.

In the embodiments of FIGS. 4a and 4b, the electrical power centre CE comprises a primary bar 23 of normal (or main) supply and a primary bar 24 of common emergency supply, the bars 23 and 24 being connected together via a contactor 25. The primary bar 23 is supplied by the two generators or by the two main transforectifiers 1 via the protections 2, incorporated in the power centre CE and supplies secondary bars 26, via primary circuit breakers 27. The primary bar 24 is connected to the ground connection 16 or to the auxiliary transfo-rectifier 1 and to the battery 3, respectively via the protections 17, 2 and 4, incorporated in the power centre CE and supplies, on the one hand, the starters 7 of the motors or 5 of the APU unit through a protection 8 or 6 and, on the other hand, secondary bars 28, via primary circuit breakers 29. At least one of the secondary bars 28 may be supplied with A.C. via an emergency A.C. generator (converter) 30 supplied from the primary bar 24. Furthermore, the power centre CE incorporates secondary circuit breakers 31, via which secondary bars may be directly supplied from the battery 3, but through the contactors 32, for constantly connected systems 34 or for ground services 33.

Line contactors 35 are interposed just upstream of the primary bars of the electrical power centre CE, on each link to an element 1, 3, 7 or 16.

The embodiments of FIGS. 4a and 4b are particularly simple; however, they present the drawback of comprising only one normal primary bar 23, which may lead to the loss of all the normal supplies in the event of fault on this bar; furthermore, the coupling of two generators in parallel (case of FIG. 4a) may present drawbacks.

The embodiments of FIGS. 5a and 5b introduce a separation between the two normal supplies which may each either supply a fraction of the network, or all of it. This arrangement allows a better segregation of the circuits and a more comfortable situation in the event of loss of a normal bar.

In fact, FIGS. 5a and 5b show that each generator or main transfo-rectifier 1 is associated with a primary bar $23_1$ or $23_2$ of normal supply. The primary bars $23_1$ and $23_2$ are connected to respective secondary bars $26_1$ and $26_2$ via primary circuit breakers 27. The primary bars $23_1$ and $23_2$ are respectively connected to the primary bar 24 of emergency supply, via contactors $25_1$ and $25_2$. The starters 7 are connected to the bars $23_1$ and $23_2$, whilst the APU unit 5 is connected to bar 24.

In the embodiment of FIGS. 6a and 6b, the on-board battery 3 has been divided into two batteries $3_1$ and $3_2$, naturally connected to the primary bar 24, and respectively supplying the secondary bars 34 and 33 via the secondary circuit breakers 31 and secondary contactors 32. Taking into account the primordial role of the emergency batteries, an additional safety factor is obtained due to such a division. Moreover, the division allows better handling of the batteries, which are always heavy elements. The diagrams of FIGS. 6a and 6b illustrate preferred embodiments of the system according to the invention.

It will be noted that the above-described systems use the same batteries for starting and emergency, which presents an advantage from the standpoint of overall evaluation of use of the batteries.

The objective of the search for the origin of smoke imposes a procedure which is as simple and rapid as possible of re-supply of the various systems from the emergency configuration in the event of smoke.

In view of the very large number of systems of a modern aircraft, this can really be envisaged only by a re-supply by groups of systems.

In fact, re-supply system by system would lead to a very long period of time due to the necessary wait to identify the cessation of smoke after each manoeuvre.

However, the risk of smoke of electrical origin, although it must be taken into account, is very low (of the order of $2.10^{-6}$) and it may be admitted that, in these rare cases, the mission is terminated with a reduced safety margin and reduced conditions of comfort.

Consequently, to benefit from the advantages relative to the fact of maintaining accessible to the pilots only the minimum number of circuit breakers, the following is considered sufficient to terminate the mission;

(1) part of the normal technical or commercial loads, (2) one sole right-hand or left-hand assembly of the indispensable systems which are in duplicate (apart from motors and motor control which will be maintained), (3) all the systems normally indispensable which are unique with the exception of the faulty system which would be eliminated.

In this way, if the independent groups capable of fulfilling all the above conditions are recapitulized, i.e. the number of primary bars and secondary bars necessary, the following list is obtained:

(1) three primary bars, namely a first bar of normal supply, such as $23_1$, a second bar of normal supply such as $23_2$ and an essential and emergency bar such as 24;

(2) a secondary bar 34 always connected on the batteries 3 (except insulation in the event of a crash);

(3) a secondary bar such as 33 for ground supply and supplied directly from batteries 3;

(4) four secondary bars of normal D.C. supply, such as secondary bars 26, of which distribution is chosen so that the loss of a normal bar $23_1$ or $23_2$ enables an assembly of systems sufficient for the pilot's comfort to be maintained;

a secondary bar of normal supply, supplied by a converter 115 V/400 Hz, in the event of the aircraft not having an A.C. source of 400 Hz;

(5) four emergency D.C. secondary bars such as 28:

a constantly supplied secondary bar which distributes supplies to all the indispensable smoke search systems of which only one exists (the secondary circuit breakers of this bar having to be within reach of the pilot);

a secondary bar supplying the unit 1 mentioned above of the duplicate systems, necessary for emergency in cruising flight;

a secondary bar supplying the unit 2 mentioned above of the duplicate systems, necessary for emergency in cruising flight;

a secondary bar supplying the systems necessary for emergency in the landing phase (secondary circuit breakers accessible to the pilots);

possibly, a smoke search bar. However, it must be noted that, in the smoke search phase, the systems necessary for ensuring forced ventilation (evacuation of the smoke) or the functioning in altitude of the motors (pumps) are generally connected to the A.C. network (regulated 400 Hz network).

These four secondary bars must be adapted to be insulated via contactors controlled from the pilot's station.

(6) An essential and emergency secondary bar 28 in A.C. mode supplied by a converter 30.

This secondary bar 28 is then divided in the same way as the D.C. bar 24.

It would obviously be desirable, to simplify the network and improve the energetic yield, to eliminate the emergency bars in A.C. mode. This can obviously be obtained only if the corresponding equipment can be supplied with D.C. current.

Figure 8:
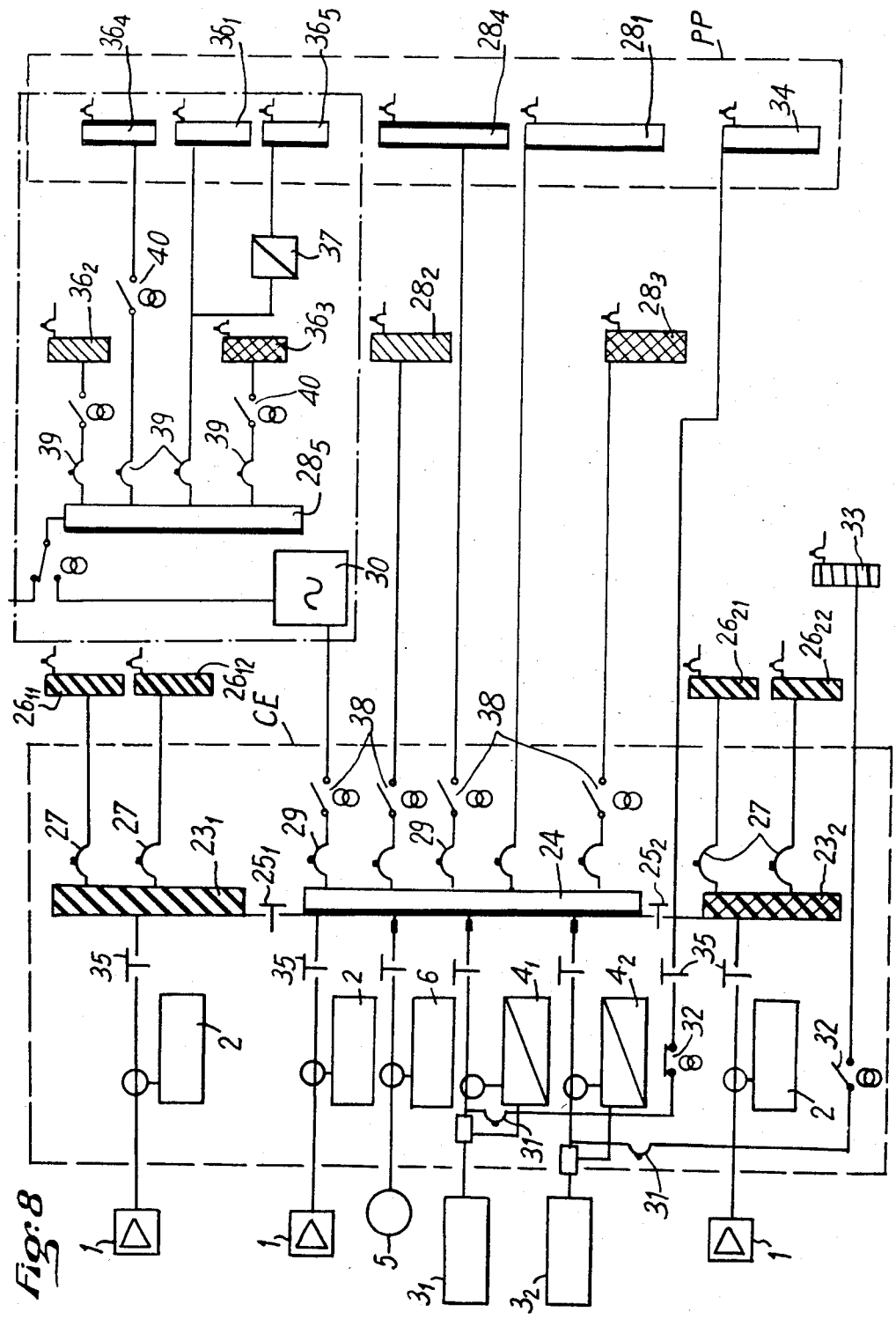
FIG. 8 shows the block diagram in greater detail of the embodiment of FIG. 6b.

FIGS. 7 and 8 illustrate embodiments of architecture in accordance with the foregoing.

The system of FIG. 7, which corresponds to that of FIG. 6a, is normally supplied by two D.C. generators 1, which also serve to start the motors M. In the case of FIG. 7, a D.C. ground connection 16 has been provided, provided with its safety system 17 (incorporated in the power centre CE). The system of FIG. 8, which corresponds to that of FIG. 6b, is supplied with D.C. current from two alternators and three transfo-rectifiers 1, of which one is connected to the primary bar 24. Moreover, in the system of FIG. 8, an auxiliary unit APU 5 has been provided which also serves to start the motors.

As may be seen in FIGS. 7 and 8, these examples of systems according to the invention comprise:

two normal primary bars $23_1$, $23_2$ and one emergency primary bar 24;

a secondary bar 34 supplied by the battery $3_1$ through a secondary circuit breaker 31 and a secondary contactor 32 of the power centre CE and disposed at the pilot's station PP;

a secondary bar 33 supplied by the battery $3_2$ through a secondary circuit breaker 31 and a secondary contactor 32 of the power centre CE;

four secondary bars $26_{11}$, $26_{12}$, $26_{21}$ and $26_{22}$ of normal supply connected respectively to the primary bars $23_1$ and $23_2$;

a secondary bar $28_1$ constantly supplied from the primary bar 24 and disposed at the pilot's station PP;

two secondary bars $28_2$ and $28_3$ which remain supplied for emergency in cruising flight, connected to the primary bar 24 through the primary circuit breakers 29 and the primary contactors 38;

a secondary bar $28_4$ disposed at the pilot's station PP and maintained for emergency in the landing phase; the secondary bar $28_4$ is connected to the primary bar 24 through a primary circuit breaker 29 and a primary contactor 38;

an emergency secondary bar $28_5$ in A.C. mode, which is subdivided into an emergency secondary bar $36_1$ in A.C. mode constantly supplied and disposed at the pilot's station PP, into two secondary bars $36_2$ and $36_3$ maintained for emergency in cruising flight and a secondary bar $36_4$ disposed at the pilot's station and maintained for emergency in the landing phase. The secondary bar $36_1$ which has a current of, for example, 115 V at 400 Hz passing therethrough, may itself produce a secondary bar $36_5$, disposed at the pilot's station PP and conveying for example a current of 26 volts, 400 Hz, due to a transformer 37.

As may be seen in FIGS. 7 and 8, the links between the primary bar 24 and the secondary bars $28_2$, $28_3$, $28_4$ and $28_5$ are effected via the primary circuit breakers 29, associated with the load-shedding primary contactors 38 (only the link between the primary bar 24 and the secondary bar $28_1$ being direct, i.e. comprising only one primary circuit breaker 29, to the exclusion of a contactor 38). Similarly, the links between the secondary bar $28_5$ and the secondary bars $36_2$, $36_3$ and $36_4$ are made via secondary circuit breakers 39, associated with load-shedding secondary contactors 40 (only the link between the secondary bar $28_5$ and the secondary bars $36_1$ and $36_5$ being direct, i.e. comprising only one secondary circuit breaker 39 to the exclusion of a contactor 40).

The presence of the load-shedding contactors 38 and 40 is due to the fact that the circuit breakers 29 and 39 used are of the conventional, manual reset type.

However, such manually controlled circuit breakers oblige:

either that they be placed in a zone accessible to the crew;

or that it be admitted that the risk of untimely tripping of the circuit breakers is compatible with the safety objectives associated with the systems that they supply.

The first choice is penalizing as the best location for the electrical power centre CE containing the primary circuit breakers 29 is generally found in a central zone of the aircraft between the motors and the user devices, and not at the pilot's station.

The second choice, although defendable in the present state of the art, nevertheless risks raising fears in the crew.

The use of remote-controlled contactor-circuit breakers 41 and 42, respectively in place of the circuit breakers 29 and 39, makes it possible to eliminate the contactors 38 and 40 and to be free of the constraints concerning the location of the electrical power centre CE. In addition, this allows a greater flexibility in the possibilities of load-shedding corresponding to the cases of smoke search and emergency.

Figure 9:
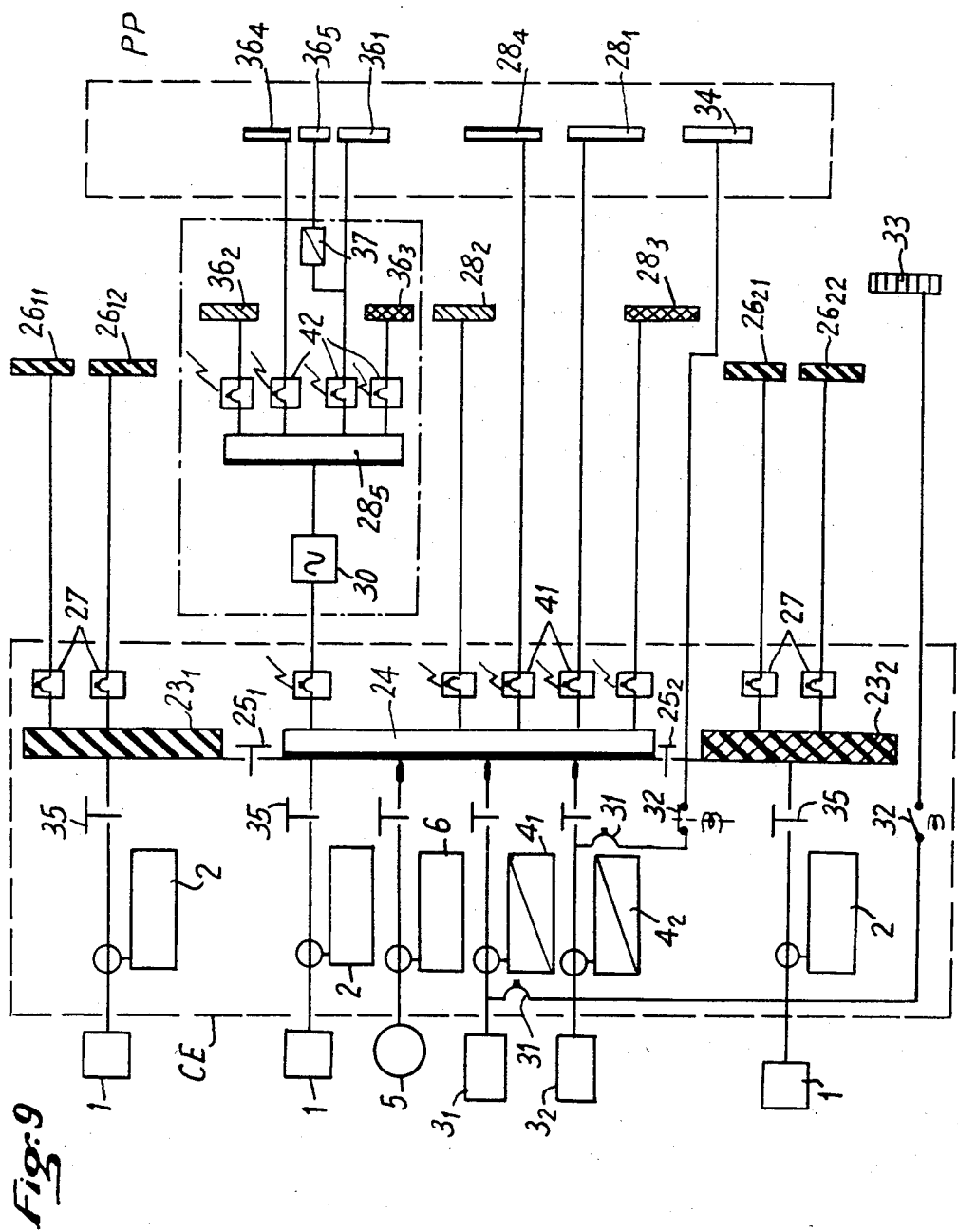
FIG. 9 illustrates a variant embodiment of the system of FIG. 8.

FIG. 9 illustrates the architecture of the system according to the invention corresponding to the use of remote-controlled contactor-circuit breakers 41 and 42.

The circuit breaker-contactors such as those used as 41 and 42 are more expensive than the manually reset circuit breakers 27, 29 and 39. Thus the use of such circuit breaker-contactors may be limited to the emergency bars $28_1$ to $28_5$ and $36_1$ to $36_5$. In the case of considerations of cost not being of prime importance, remote-controlled circuit breaker-contactors might advantageously be used for performing the functions of the primary and secondary circuit breakers 27 and 31.

Of course, the dimensioning of the elements of the system for generating and distributing electrical energy according to the invention depends on the type of aircraft envisaged, on its mission and its passenger carrying capacity; however, certain elements are of such nature as to restrict the differences in power which may be imagined.

In fact, the user companies do not wish the aircraft to comprise too many electrical batteries which are heavy and raise problems of maintenance; in addition, the use of high electrical powers under a relatively low voltage (at present standardized at 28 V) would impose very heavy wiring which is difficult to install.

The dimensioning of the batteries and the elements of the electrical power centre CE is in fact determined, on the one hand, by the instantaneous power necessary for starting up the motors, on the other hand, by the power necessary for maintaining the vital equipment in operation, for a sufficient length of time, in an emergency.

Concerning the starting power, in the case of commercial twin-engine aircraft, two important categories may be distinguished:

1. aircraft which comprise motors started directly via electric starters or generator starters and of which the power of each motor is relatively average (about 800 to 1000 hp for example).

2. more powerful aircraft comprising an auxiliary power unit (APU) making it possible to start the motors with compressed air, these auxiliary power units being machines with a power of the order of 600 to 800 hp.

Concerning the energy to be stored for an emergency, the aircraft of the second category generally require a little more than the aircraft of the first (as they are more sophisticated).

FIGS. 10, 11 and 12 show an advantageous embodiment of the electrical power centre CE according to the invention, for the case of a system for twin-engine aircraft of the type of FIG. 9 provided with two alternators each equipped with a transfo-rectifier 1, an auxiliary power unit 5 of APU type and three batteries $3_1$, $3_2$ and $3_3$.

This embodiment comprises a box 45 fixed by its bottom on a vertical wall 46. The front face of the box is open (but may possibly be closed by a door or lid) so as to render the different elements that it contains accessible.

In the lower part of the box 45 is disposed all the electronic part of the power centre CE, namely the protections 2 of the transfo-rectifiers 1, the protections $4_1$, $4_2$ and $4_3$ of the batteries $3_1$, $3_2$ and $3_3$, the protection 6 of the unit 5 and a test module 47, the links 15 to the transfo-rectifiers 1, to the batteries $3_1$, $3_2$ and $3_3$ and to the starter of the unit 5 penetrating in said box 45 by its lower part. The lower wall of the box 45 is constituted by a grid 48.

In the median part of the box (with respect to the height) are housed the primary contactors $25_1$, $25_2$, 35, as well as the secondary circuit breakers 31 and their associated contactors 32, the normal primary bars $23_1$ and $23_2$ and the essential and emergency primary bar 24.

In the upper part of the box are housed the circuit breakers 27 and 41 and the links to the secondary bars $26_{11}$, $26_{12}$, $26_{21}$, $26_{22}$ of normal supply and to the secondary bars 28$_1$ to 28$_5$ of emergency supply, these links emerging from the box 45 by its upper part in the form of a grid 49.

Widthwise, the interior of the box 45 is subdivided by two fire-stop walls 50 and 51 into a median space comprising the protections 4$_1$, 4$_2$, 4$_3$ and 6, the test module 47, the secondary circuit breakers 31, the contactors 32, the contactors 35, the primary emergency bar 24 and the circuit breakers 41, and into two lateral spaces each associated with a normal supply line from a generator 1.

The main interest of the embodiment in integrated form as shown in FIGS. 10, 11 and 12 of the assembly constituting the electrical power centre CE according to the invention resides essentially in the savings which may be obtained:

1. in weight, by reduction of the links between the various components and elimination of all the connecting elements (connectors-terminal boxes, etc ...) which are necessary when the elements are separated.

2. in the manufacturing cycle, by the possibility of making a complete assembly which may be monitored before being assembled and which is installed on an aircraft by simple connections.

3. in easy maintenance, by the rational study of the replaceable elements identified by a maintenance aid system.

4. in the cost price which may be reduced in relation with the saving in weight, the saving in assembly time, and the increase in the series for the elements covering several types of aircraft.

The practical embodiment of FIGS. 10, 11 and 12 takes into account a certain number of constraints:

in order to obtain the best safety level, this embodiment makes it possible, despite a high concentration of components, to maintain between the circuits a sufficient segregation for a breakdown (fire or rupture) on an element not to be detrimental to the other components. This is obtained by the rational arrangement of the elements and the partition 50, 51.

the electrical power centre CE according to the invention constitutes a dismountable assembly which allows, on the one hand, an easy installation when constructing the aircraft, on the other hand, an exchange during maintenance or major checks. Furthermore, the components that it comprises are easily accessible from outside to allow a replacement in situ. To this end, the electronic part (2, 6, 4$_1$, 4$_2$, 4$_3$, 47) may be in the form of plug-in modules or cards.

in order to avoid expensive services, the elements and the arrangement thereof have been studied for the dissipation of heat due to functioning in all the normal configurations and breakdowns is ensured by natural ventilation through the grids 48 and 49, whilst allowing the adaptation of a forced ventilation if this is necessary.

In certain cases, it may be advantageous to divide the central unit CE into two physically distinct parts CE1 and CE2. FIG. 13 shows an embodiment of this type, applied to the system of FIG. 9. The primary bar 24 itself is then divided into two parts 24$_1$ and 24$_2$, disposed respectively in parts CE$_1$ and CE$_2$ and connected to each other by a contactor 25$_3$: one of the batteries 3$_1$ supplies the bar 24$_1$ and the other battery 3$_2$, the bar 24$_2$. It is seen that this arrangement makes it possible to increase safety with respect to the system of FIG. 9, since there are then two primary bars 24$_1$ and 24$_2$, instead of one, which may possibly be mounted in series (to form the bar 24) or separated from each other by control of the contactor 25$_3$ in the event of trouble on one of them.

The link of the power centres CE$_1$ and CE$_2$ may be protected by a protection located in each of the power centres.

Whatever the combination, this protection may be effected either by dividing the contactor 25$_3$ into two contactors each mounted in the power centres CE$_1$ and CE$_2$, or by eliminating the contactors 25$_1$ and 25$_2$, the bars 23$_1$ and 24$_1$, 24$_2$ and 23$_2$ becoming unique.

What is claimed is:

1. In a system for producing and distributing electrical energy for aircraft having at least two motors, said system comprising at least two main generators of D.C. or A.C. type moved by the motors of the aircraft, at least one storage battery, starters for said motors, an electrical power centre formed by primary bars supplied from said main generators, primary contactors and primary circuit breakers, an assembly of secondary bars supplied from the primary bars, secondary contactors and secondary circuit breakers, an assembly of relay boxes and electrical bays, an assembly of electronic bays, control panels, user devices, as well as a plurality of regulating and/or protecting means for the generators, the battery and the starters, the improvement comprising a central unit grouping together said electrical power centre, a part of said assembly of circuit breakers and secondary contactors, and said regulating and/or protecting means, the rest of said assembly 10 of circuit breakers and secondary contactors being distributed bewteen the assembly of relay boxes and electrical bays, the assembly 12 of electronic bays and each of the control panels, said central unit comprising:

as many primary bars of normal supply as there are generators, each of said primary bars of normal supply being supplied by one generator through means for protecting the latter and supplying at least one secondary bar of normal supply through a first primary circuit breaker;

a primary bar of essential and emergency supply connected to said battery through means for protecting and regulating the latter and to each of said primary bars of normal supply by a plurality of primary contactors and supplying a plurality of secondary bars of essential and emergency supply through the second primary circuit breakers; and at least one secondary circuit breaker and one secondary contactor directly connecting a secondary bar to the battery.

2. The system of claim 1, wherein said central unit comprises two secondary circuit breakers and two associated secondary contactors connecting to the battery two secondary bars of which one supplies systems having to remain constantly connected and of which the other serves specifically to supply equipment when the aircraft is on the ground.

3. The system of claim 1, wherein it comprises at least two storage batteries connected in parallel to said primary bar of emergency supply.

4. The system of claim 1, wherein the plurality of essential and emergency secondary bars supplied by the essential and emergency primary bar through the second primary circuit breakers comprise at least one secondary bar disposed at the pilot's station and adapted to supply approach and landing equipment, at least one secondary bar supplying circuit breakers accessible to the pilots and adapted for common essential and emergency supply, and at least one, but preferably two, secondary bars intended for emergency supply.

5. The system of claim 1, of the D.C. type, wherein at least one of the emergency secondary bars is supplied by the emergency primary bar through said secondary primary circuit breakers and a D.C.-A.C. converter and this essential and emergency secondary bar in A.C. mode supplies a plurality of A.C. secondary sub-bars, of which at least one supplies circuit breakers accessible to the pilots and is adapted to supply approach and landing equipment, of which at least one other supplies circuit breakers accessible to the pilots and is adapted for emergency supply and of which at least one third is disposed as a function of commodities of the installation and intended for emergency supply.

6. The system of claim 1, wherein at least said second primary circuit breakers are of the circuit breaker-contactor type.

7. Central unit for a system for producing and distributing electrical energy for aircraft having at least two motors, said system comprising at least two main generators of D.C. or A.C. type moved by the motors of the aircraft, at least one storage battery, starters for said motors, an electrical power centre formed by primary bars supplied from said main generators, primary contactors and primary circuit breakers, an assembly of secondary bars supplied from the primary bars, secondary contactors and secondary circuit breakers, an assembly of relay boxes and electrical bays, an assembly of electronic bays, control panels, user devices as well as a plurality of regulating and/or protecting means, for the generators, the battery and the starters, wherein said central unit groups together said electrical power centre, part of said assembly of circuit breakers and secondary contactors, and said regulating and/or protecting means, and the rest of said assembly of circuit breakers and secondary contactors is distributed between the assembly of relay boxes and electrical bays, the assembly of the electronic bays and each of the control panels, said central unit comprising:

as many primary bars of normal supply as there are generators, each of said primary bars of normal supply being supplied by one generator through means for protecting the latter and supplying at least one secondary bar of normal supply through a first primary circuit breaker;

a primary bar of essential and emergency supply connected to said battery through means for protecting and regulating the latter and to each of said primary bars of normal supply by a plurality of primary contactors and supplying a plurality of secondary bars of essential and emergency supply through the second primary circuit breakers; and at least one secondary circuit breaker and one secondary contactor directly connecting a secondary bar to the battery.

8. The central unit of claim 7, further comprising a mural box of which the lower part encloses the different regulating and/or protecting means, of which the median part with respect to the height comprises the primary contactors, the secondary circuit breakers, the associated secondary contactors and the primary bars and of which the upper part comprises the primary circuit breakers.

9. The central unit of claim 8, for a system intended for a twin-engined aircraft and comprising two primary bars of normal supply and a primary bar of essential and emergency supply, wherein the interior of the box is separated heightwise by fire-stop walls defining three compartments, such that the median compartment encloses the elements relative to the primary bar of essential and emergency supply, whilst each of the lateral compartments encloses the elements relative to one of said primary bars of normal supply.

10. The central unit of claim 7, wherein said box comprises perforated walls allowing natural ventilation or the adaptation of a forced ventilation.

11. The central unit of claim 8, wherein a primary bar of essential and emergency supply is divided into two parts connected by a contactor and the box is also divided into two physically separated parts.

* * * * *